United States Patent
Nojima et al.

(10) Patent No.: US 6,336,038 B1
(45) Date of Patent: Jan. 1, 2002

(54) INFORMATION TERMINAL DEVICE AND CONTROL METHOD FOR THE SAME

(75) Inventors: Akihiko Nojima, Toyota (JP); Masanobu Yamashita, Mclean, VA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/204,172

(22) Filed: Dec. 3, 1998

(30) Foreign Application Priority Data

Dec. 3, 1997 (JP) .................................................. 9-332837

(51) Int. Cl.[7] .................................................. H04B 1/38
(52) U.S. Cl. .......................... 455/557; 455/410; 455/422
(58) Field of Search ..................................... 455/405, 406, 455/407, 408, 409, 410, 411, 556, 557, 550, 422, 456, 569

(56) References Cited

U.S. PATENT DOCUMENTS

| | | | | |
|---|---|---|---|---|
| 5,325,418 A | * | 6/1994 | McGregor et al. | 455/409 |
| 5,550,907 A | * | 8/1996 | Carlsen | 455/556 |
| 5,561,703 A | * | 10/1996 | Arledge et al. | 455/556 |
| 5,878,340 A | * | 3/1999 | Asaoka et al. | 455/422 |
| 5,884,186 A | * | 3/1999 | Hidaka | 455/557 |
| 6,035,214 A | * | 3/2000 | Henderson | 455/556 |
| 6,061,718 A | * | 5/2000 | Nelson | 455/550 |

FOREIGN PATENT DOCUMENTS

| | | |
|---|---|---|
| GB | 2 241 133 A | 8/1991 |
| JP | 61-103705 | 7/1986 |
| JP | 07-105492 A | 4/1995 |
| JP | 08-097852 A | 4/1996 |
| WO | WO 95/25391 | 9/1995 |

* cited by examiner

*Primary Examiner*—Nay Maung
*Assistant Examiner*—Quochien B. Vuong
(74) *Attorney, Agent, or Firm*—Pillsbury Winthrop LLP

(57) ABSTRACT

An information terminal device and a cellular phone are interconnected by a connector in order to efficiently perform the locking of personal information separate for individual users. A number checking unit compares the phone number of the cellular phone with phone numbers stored in a memory of the information terminal device. In accordance with the phone number of the cellular phone, the information terminal device manages the access to the information stored in an external information storage and a location point list storage.

45 Claims, 6 Drawing Sheets

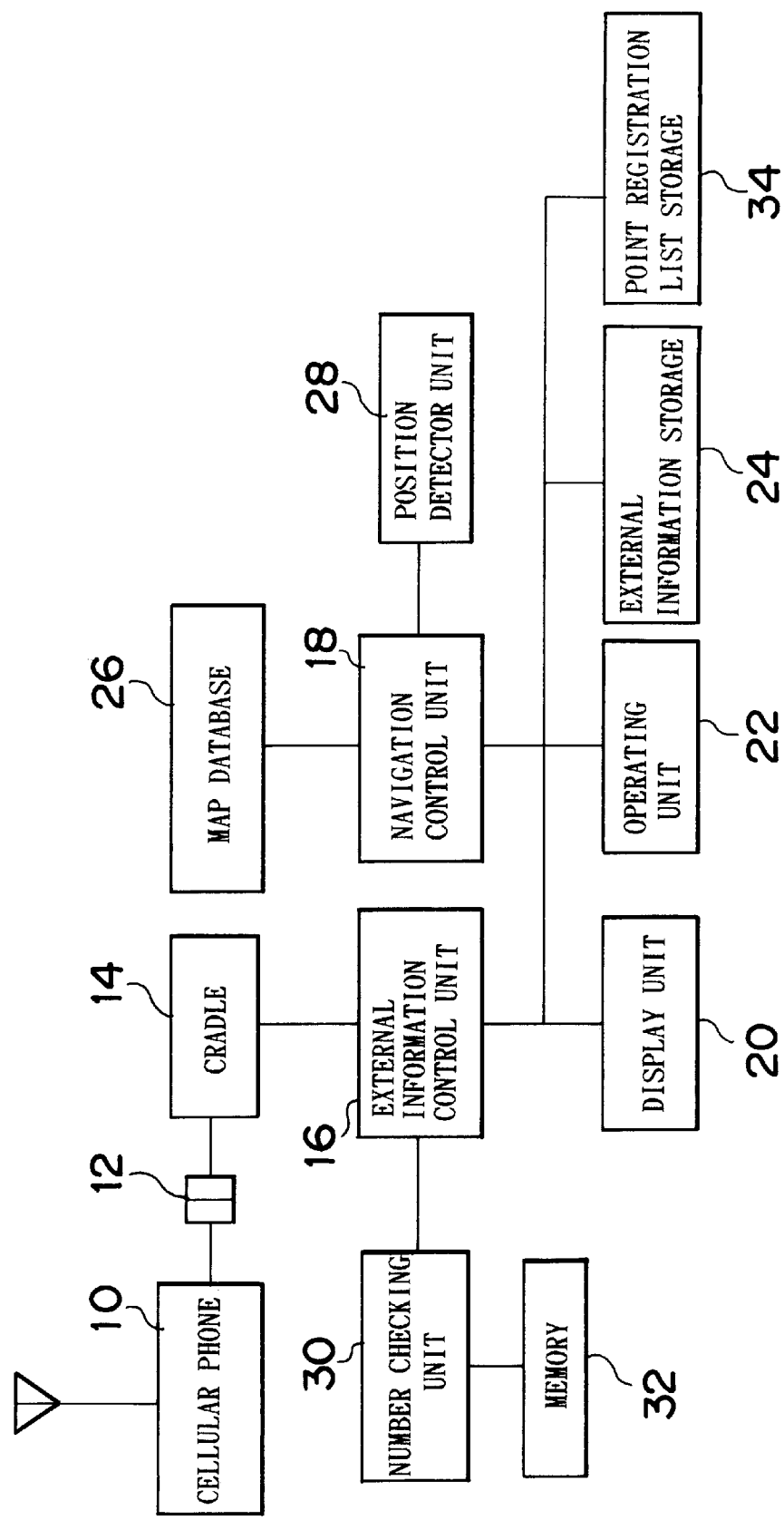

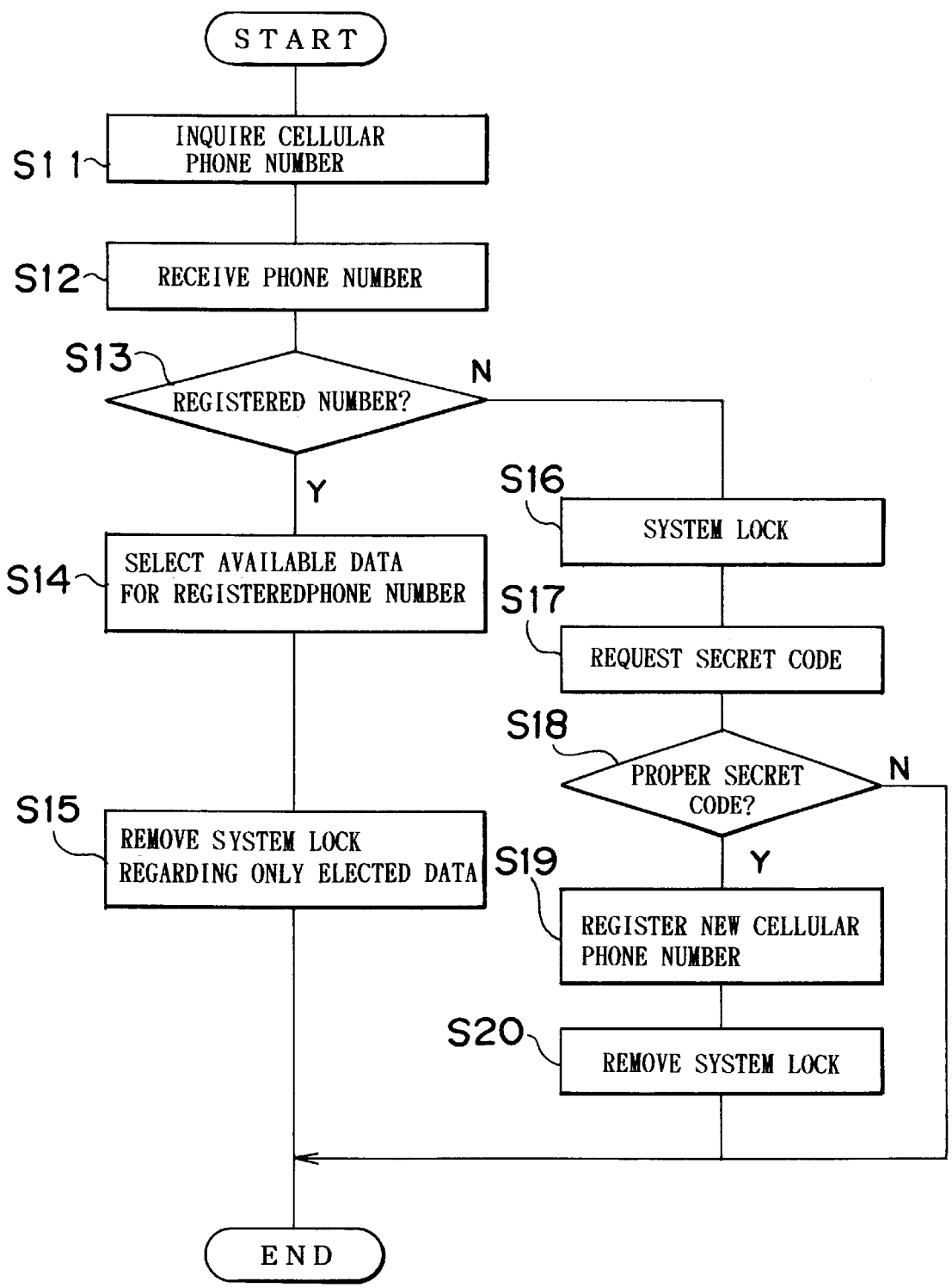

FIG. 3

| NO. | SENDER | DATE | TITLE |
|---|---|---|---|
| 1. | NAOMI ◇◇◇ | 1997.7/10 22:07 | THANK YOU. |
| 2. | NAOMI ◇◇◇ | 1997.7/13 21:50 | RE:THANK YOU. |
| 3. | ○○ TAROBEI | 1997.7/15 8:19 | URGENT BUSINESS TRIP |
| 4. | NAOMI ◇◇◇ | 1997.7/16 23:00 | RE:THANK YOU. |
| 5. | △△MOTO ●●KICHI | 1997.7/16 23:51 | NEW PRODUCT |
| 6. | ○○ TAROBEI | 1997.7/17 13:09 | RE:URGENT BUSINESS TRIP |
| 7. | NAOMI ◇◇◇ | 1997.7/17 20:46 | HOW ABOUT TOMORROW? |
| . | | | |
| . | | | |
| . | | | |

FIG. 4

| NO. | SENDER | DATE | TITLE |
|---|---|---|---|
| 1. | YAMAMOTO ○○ | 1997.5/10 22:00 | ENGLISH LANGUAGE HOMEWORK |
| 2. | YAMAMOTO ○○ | 1997.7/10 21:00 | STUDY FOR ENGLISH TEST |
| 3. | TAKEMOTO ○○ | 1997.8/3 14:30 | INFORMATION ON △△ UNIVERSITY |

FIG. 5

| NO. | SENDER | DATE | TITLE |
|---|---|---|---|
| 1. | ○○ YOKO | 1997.6/8 20:00 | COOKING CLASS |
| 2. | ○○ MIE | 1997.8/19 7:38 | DANCE CLASS |

| MEMORY POINT | (REMAINING MEMORY:100) |

SELECT ITEM BY CURSOR, PRESS ENTER

- SET MEMORY POINT
- CORRECT MEMORY POINT
- ERASE MEMORY POINT
- SET, CORRECT, ERASE HOME POINT

RETURN

CELLULAR PHONE A  CELLULAR PHONE B  CELLULAR PHONE N

INFORMATION TERMINAL DEVICE AND CONTROL METHOD FOR THE SAME

INCORPORATION BY REFERENCE

The disclosure of Japanese Patent Application No. HEI 9-332837 filed on Dec. 3, 1997 including the specification, drawings and abstract is incorporated herein by reference in its entirety.

BACKGROUND OF THE INVENTION

1. Field of the Invention

The present invention relates in general to an information terminal device connectable to a cellular phone and control method for the device. More particularly, the invention relates to lock control for preventing a memory of the information terminal device from outputting its content.

2. Description of the Related Art

In keeping with the increasing availability of various communication systems using computers, cellular phones or other communication devices and systems, there are proposed various technologies that use information terminals, such as portable terminals, vehicle-installed terminals and the like, for sending and receiving E-mails (messages) or utilizing on-line information services. The demand to utilize on-line information services is strong particularly in conjunction with vehicle-installed terminals, because during travel, often times a driver or a passenger desires to obtain information helpful to travel such as, for example, the location of parking lots near a destination, traffic condition on route to the destination, etc.

Japanese Patent Application Laid-open No. HEI 7-105492 discloses a system in which a driver can obtain desired information (various facility information, restaurant information, and the like) by using a vehicle-installed telephone.

In many cases, an information terminal device is used by only one person. In fact, its use is very often limited to a specific person. As for vehicle-installed terminals, it is also often the case that such a terminal is used only by a specific person. Therefore, most information stored in information terminal devices is information related to individuals. Normally, the user of such a device desires that such personal information be kept confidential, and it is desirable to provide some security arrangement to protect the personal information. For security protection in, for example, personal computers, it is a widespread procedure to input the name and password of a user before an application is started. However, such a procedure combersome and inconvenient in the case of a portable terminal device, a vehicle-installed terminal device or the like.

SUMMARY OF THE INVENTION

Accordingly, it is an object of the present invention to provide an information terminal device capable of easily and securely locking access to individual person-related information.

According to one aspect of the invention, there is provided an information terminal device including a connection device for connecting to a cellular phone that communicates with an external device, a communication device for communicating data with the cellular phone connected to the connection device, a memory that stores data, a data output unit that outputs data stored in the memory, an access control device for allowing or preventing access to data stored in the memory, and a detection device for detecting an identification number of the cellular phone. The access control device prevents access to data stored in the memory if the identification number is not pre-registered or if the identification number is not detected.

This information terminal device specifies a user and determines information accessible by the user, only if the user connects a cellular phone to the device. Therefore, the information terminal device improves security of personal data and controls access to data stored in the information terminal device, by requiring a user merely to perform a simple operation, that is, to connect a cellular phone, instead of requiring a user to perform a more complicated operation. In this aspect of the invention, the identification number of the cellular phone may the same as its phone number.

The information terminal device may allow a plurality of identification numbers of cellular phones to be registered, so that the use of the various information stored in the memory may be controlled separately for each identification number. The information terminal device specifies a user by the cellular phone connected thereto by the user. Therefore, even if a plurality of users use a single information terminal device, data management can be performed separately for each user.

According to another aspect of the invention, there is provided an information terminal device further including a navigation device in addition to the construction described above. Data to be access controlled may be data that is settable by a user of the navigation device. Therefore, confidentiality can be maintained separately for each user by preventing access to data such as registered location points used for setting a destination.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIG. 1 is a block diagram illustrating the overall construction of a device according to an embodiment of the invention;

FIG. 2 is a flowchart illustrating a lock control operation;

FIGS. 3 through 5 show examples of received E-mail record lists;

DETAILED DESCRIPTION OF PREFERRED EMBODIMENT

Figures 6, 7:
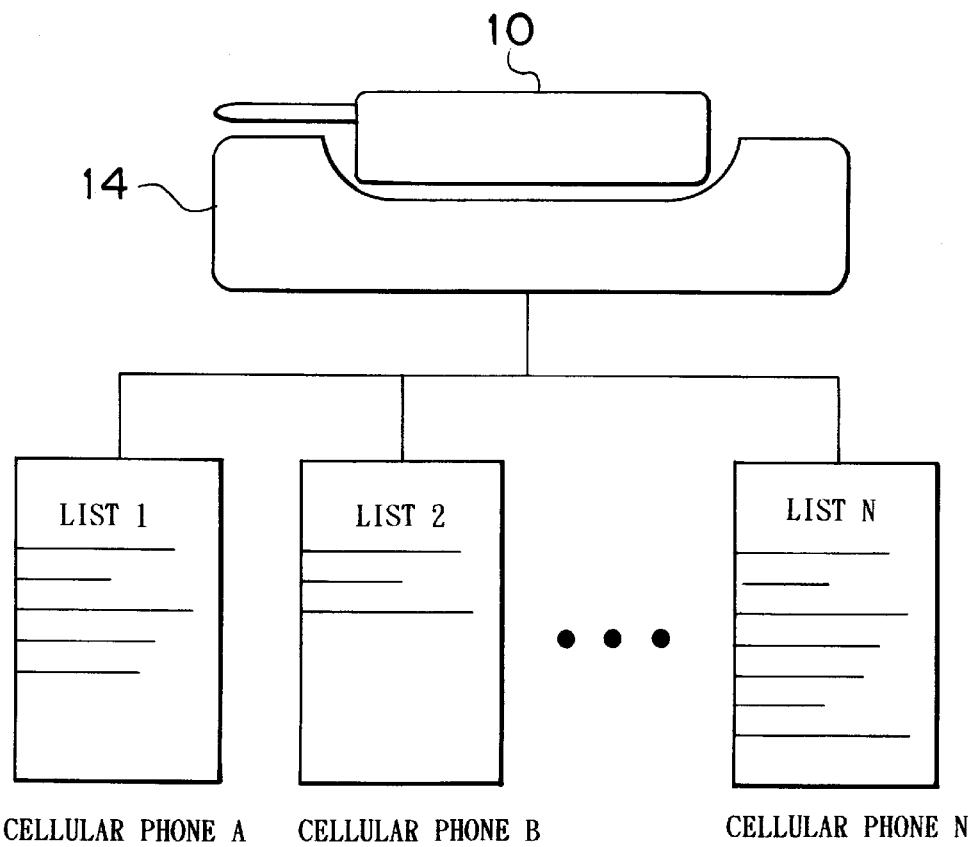
FIG. 6 illustrates a menu screen for a location point registering memory operation.
FIG. 7 is a schematic illustration of list management.

A preferred embodiment of the present invention will be described in detail hereinafter with reference to the accompanying drawings.

FIG. 1 is a block diagram illustrating the overall construction of a mobile terminal device according to an embodiment of the information terminal device of the invention. A cellular phone 10 capable of wireless telephone communication is connected to a cradle 14 by a connector 12. The cradle 14 contains or at least has associated therewith a modem capable of modulation/demodulation processing for data communication. The cradle 14 is connected to an antenna, a speaker, a microphone and the like (not shown). When the cellular phone 10 is set on the cradle 14, the cradle 14 becomes able to perform various functions of the cellular phone 10 so that the cradle 14 will operate as a hands-free telephone.

An external information control unit 16 is connected to the cradle 14. The external information control unit 16 controls acquisition of information from an external information center (external database) to which the terminal device is connected by the cellular phone 10, and data communication with the cellular phone 10. The external information control unit 16 also manages E-mail transmission and reception.

A navigation control unit 18 is connected to the external information control unit 16. The navigation control unit 18 performs various operations for route guidance. The external information control unit 16 and the navigation control unit 18 are connected to a display unit 20 and an operating unit 22. The display unit 20 can include, for example a liquid crystal display, or the like and displays various texts. The operating unit 22 includes various switches and a touch panel provided on a front surface of the display unit 20. The operating unit 22 inputs various information upon operation by a user.

An external information storage 24 is connected to the external information control unit 16 and the navigation control unit 18. The external information storage 24 stores on-line information received, e-mails transmitted or received, and other various information.

A map database 26 and a position detector unit 28 are connected to the navigation control unit 18. The map database 26 stores nation-wide map data. The position detector unit 28 detects the present position of a mobile body (the vehicle) all the time. The position detector unit 28 may include a Global Positioning System (GPS), a Differential GPS (DGPS), and the like for detecting a position through the use of satellites and electromagnetic waves. It is preferable to additionally utilize information from beacons installed on roads, the self-controlled driving, and the like, so as to obtain high-precision position information.

The external information control unit 16 is also connected to a number checking unit 30 that checks the phone number of a cellular phone. The number checking unit 30 is connected to a memory 32 that stores registered numbers to be compared.

The navigation control unit 18 is also connected to a point registration list storage 34 for storing position data regarding location points that are used as a destination in navigation or the like. The point registration list storage 34 also stores a travel locus in a predetermined travel.

This terminal device performs the search for a route to a destination, the display of a present position during a travel, travel guidance, and the like, in manners similar to those in typical navigation devices. In the setting of a destination, it is possible to retrieve a location point registration list from the point registration list storage 34 upon operation of the operating unit 22, so that the destination can be selected from the list. The terminal device is also able to read the travel locus of the vehicle from the storage in order to set a route to the destination.

To transmit an E-mail, the user selects an e-mail writing screen through an input from the operating unit 22. The user creates an E-mail by inputting a title, an address, and a main body, and transmits the E-mail via the cradle 14 and the cellular phone 10. When an E-mail to the user is transmitted, the external information control unit 16 receives the E-mail via the cellular phone 10 and the cradle 14, and then stores the E-mail into the external information storage 24 and also displays it in the display unit 20.

To obtain information from an external database, the operating unit 22 is operated to select a screen regarding the on-line information services. When a desired external database is selected in the screen, the terminal device calls the external database by using the cellular phone 10, and connects to the line. Subsequently, the terminal device transmits a predetermined search expression inputted through the operating unit 22, and then receives a predetermined answer from the external database. The received answer is stored into the external information storage 24.

In this embodiment, the functions including the data output to the display unit 20 are locked in a predetermined manner by using the phone number of the cellular phone connected to the connector 12. An operation performed when the cellular phone 10 is connected to the cradle 14 while the system has been started will be described with reference to the flowchart shown in FIG. 2. It should be recognized here that the functions carried out by various of the blocks shown in FIG. 1 and the various functions described by the flowchart in FIG. 2 can be implemented in various ways. They could be implemented by 'hard wired' logic circuits or by programming a general purpose microprocessor or other computing devices. The term "controller" is meant to describe any such functional implementation. The claims presented herein are intended to cover any such implementation.

The following description relates to FIG. 2. When the cellular phone 10 is connected to the connector 12, the external information control unit 16 first communicates with the cellular phone 10 and inquires the phone number of the cellular phone 10 in step S11. Subsequently in step S12, the external information control unit 16 receives the phone number of the cellular phone 10 from the cellular phone 10.

Subsequently in step S13, the external information control unit 16 checks whether the received phone number is a registered phone number by using the number checking unit 30 to compare the received phone number with the phone numbers registered in the memory 32. If it is determined that the received phone number is a registered phone number, the external information control unit 16 selects data available in the system on the basis of the data stored in the memory 32 corresponding to each registered phone number in step S14. The memory 32 includes, for example, pre-stored data that specifies the data accessible in the external information storage 24 or the point registration list storage 34. Therefore, by retrieving the data, the readable data is determined. It is also possible to set a flag for each registered phone number and determine accessible data among the data stored in the external information storage 24 and the point registration list storage 34 corresponding to each phone number with reference to the flag indication.

After the accessible data is selected in this manner, only the selected data is unlocked, so that access to the data is enabled in step S15. Therefore, in the subsequent operation, the unlocked data can be read out and rewritten, so that the data can be displayed in the display unit 20 and various operations using the data can be performed.

Conversely, if the determination in step S13 is negative (that is, if the phone number of the cellular phone 10 is not a registered phone number), the system is locked in step S16. Since an unregistered phone number means that the owner of the cellular phone 10 connected to the connector 12, that is, the person presently using the terminal device, is not identified, the terminal device prevents the access to the external database, and the access to the external information storage 24 and the point registration list storage 34, in this case. In this operation, the external information control unit 16 or the navigation control unit 18 functions as a lock control device.

Subsequently, the external information control unit 16 requests a secret code in step S17, and determines in step S18 whether the inputted secret code is proper. If it is determined in step S18 that a proper secret code is not inputted, the operation ends, with the system remaining locked. In a case where there is no input of a code, it is also possible to wait for a predetermined length of time, or request input again after a predetermined length of time, instead of immediately ending the operation. It is also possible to request re-input of the secret code if a code inputted is an error or does not match.

If the determination in step S18 is affirmative, the external information control unit 16 registers the phone number of the connected cellular phone 10 into the memory 32, and selects an accessible area in step S19. Subsequently in step S20, the system lock is removed. Therefore, if a user knowing a proper secret code connects a new cellular phone 10 to the connector 12, the phone number of the new cellular phone 10 can be registered, and the access to the external database and the like is allowed. However, the access to the data corresponding to other cellular phones is not allowed.

The mobile terminal device of this embodiment manages accessible data in accordance with the phone number of the cellular phone 10 in the manner described above. Therefore, simply by connecting a cellular phone 10 to the cradle 14, the identification of the user can be automatically performed practically in the same manner as in the case where a secret code is used. If the phone number of the cellular phone 10 is already registered, the user does not need to conduct a troublesome identifying operation since the identification operation is automatically performed as described above.

In order to cope with a case where a user upgrades the cellular phone 10 to a new one, it is preferred to design the terminal device so that the rewriting of the registered phone number is allowed by, for example, inputting the old phone number so that the previously stored data can be accessed by using the new cellular phone 10. It is also possible to allow only the terminal manager to perform such a rewriting operation.

FIGS. 3 through 5 show examples of the data management of received E-mail record lists. FIGS. 3 through 5 show received E-mail lists obtained when a corresponding one of three cellular phones, for example, cellular phone A, cellular phone B and cellular phone C, is connected. Corresponding to each cellular phone, only the list of E-mails addressed to the user of the cellular phone is provided. The received E-mail lists are stored in the external information storage 24.

It is also preferable to control the data management in the point registration list storage 34 through the use of a cellular phone. If, for example, the operation of setting, correcting or erasing a memory location point is to be performed, a menu screen as shown in FIG. 6 is displayed. Each of the aforementioned operations can be performed by selecting "SET MEMORY POINT", "CORRECT MEMORY POINT", "ERASE MEMORY POINT", and the like. All the concerned data is stored in the point registration list storage 34 corresponding to the individual cellular phones. Therefore, as for the reading of memory location points, only the data stored corresponding to the cellular phone presently connected can be read out.

More specifically, of a plurality of stored lists, only the list corresponding to the phone number of the cellular phone 10 connected to the cradle 14 is automatically selected and displayed, as indicated by the schematic diagram shown in FIG. 7. Then, the user selects necessary pieces of information from the displayed list. In this manner, the mobile terminal device allows access only to the data registered corresponding to the user of the cellular phone.

Besides the management of E-mails and registered location points as described above, this invention is also applicable to the management of abbreviated phone number lists, phone number lists, information search results, toll records in the automatic tolling system, travel locus memories, registered routes, and the like, in substantially the same manner as described above.

Figure 8:
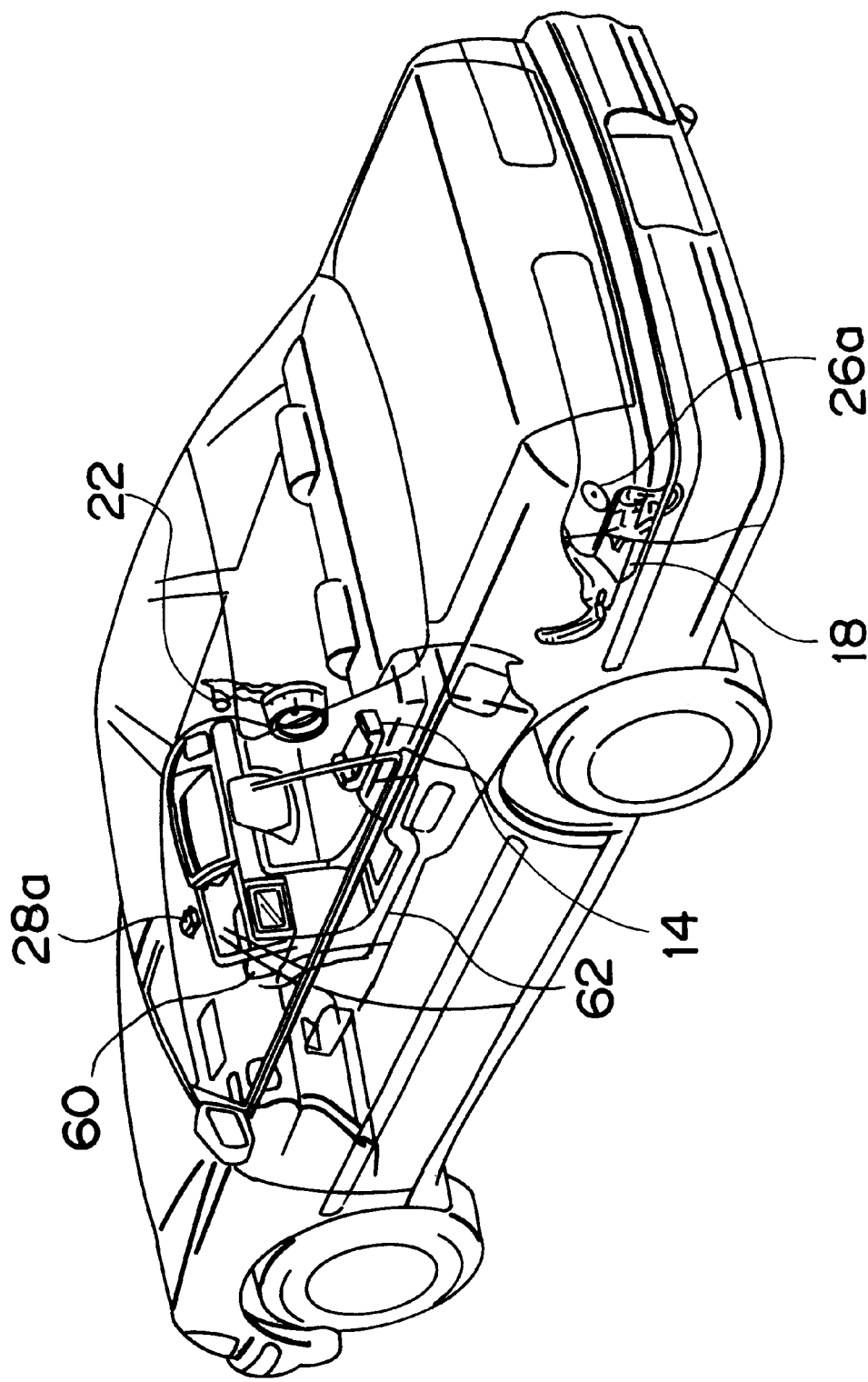
FIG. 8 is an schematic view showing a device according to the invention installed in a vehicle.

FIG. 8 is a schematic view showing a mobile terminal device as described above installed in a vehicle. A GPS antenna 28a, forming a portion of the position detector unit 28, is disposed above an instrument panel in a passenger compartment. A CD-ROM or CD-ROMs 26a, forming a portion of the navigation control unit 18 and the map database 26, are disposed in a rear trunk. The display unit 20 and the external information control unit 16 are formed as a single unit, that is, a wide-multi-station 60. The wide-multi-station 60 is disposed in a space between the driver-side seat and the passenger-side seat. The wide-multi-station 60 is connected by a cable 62 to the cradle 14, which causes the cellular phone 10 to operate as a hands-free phone.

Figure 9:
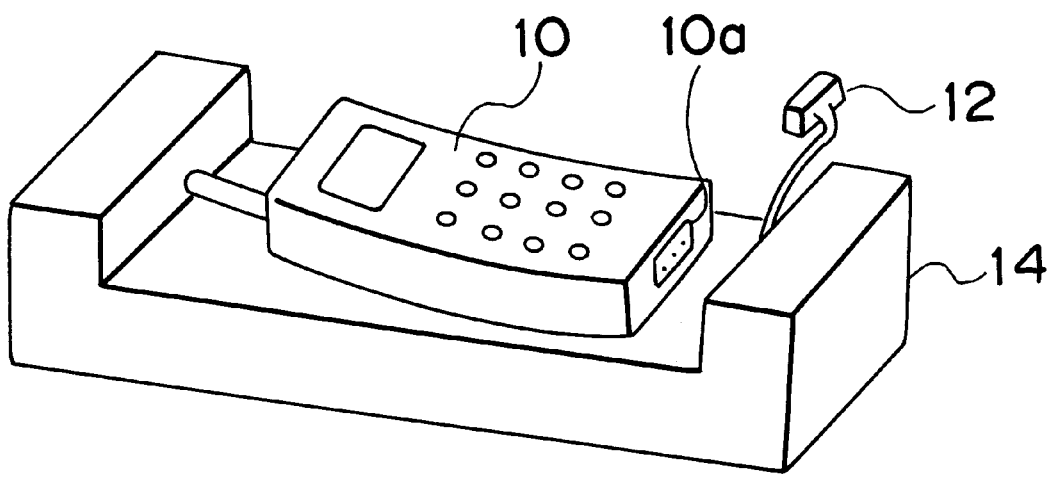
FIG. 9 illustrates the construction of a cellular phone set on a cradle.

In this installation example, the cellular phone 10 is set on the cradle 14 as shown in FIG. 9. The cellular phone 10 becomes actually connected to the cradle 14 by connecting the connector 12 to a connector jack 10a of the cellular phone 10. The cradle 14 is connected to various devices (not shown) needed for hands-free telephone communication, such as a microphone, a speaker, a one-touch dial button device, and the like. Thus, the cellular phone 10 can be used as a hands-free telephone.

The various operations are performed by using an input operating portion of the wide-multi-station 60. The invention is not limited to the above-described construction employing the cellular phone 10. It is also preferable to provide a vehicle installation-dedicated telephone system.

Although in the foregoing embodiment, the phone number of the cellular phone 10 is used as data for specifying a user, the user-specifying data may also be other data, for example, stored telephone numbers, production numbers, or the like, as long as the data specifies the cellular phone 10 and can be outputted. Furthermore, it is also possible to provide a construction in which a user number of the cellular phone 10 can be set by inserting a user card or the like into the cellular phone 10. If the cellular phone 10 is replaced to another one in this construction, the accessible range can still be determined by using the user number as long as the user number remains unchanged.

It is also preferable to control a system lock described above, in accordance with the present position detected by the position detector unit 28. This construction enables access management in which, for example, if the vehicle is travelling along a predetermined route, such as a commuting road, the access to certain data is allowed. It is also possible to detect the present time based on a signal from an internal timer provided in the navigation control unit 18 or the external information control unit 16, or an external clock, and control the lock operated by the aforementioned lock control device in accordance with the detected present time. With this construction, available data can be controlled in accordance with time.

Furthermore, although in the foregoing embodiment, the cellular phone 10 and the cradle 14 are interconnected by the connector 12, the cellular phone 10 and the cradle 14 may also be connected by using infrared communication in, for example, the IrDA method or the like, instead of using the aforementioned connector.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. An information terminal device comprising:
    a connector that connects to a cellular phone that communicates with an external device;
    a communicator that controls data communication with the cellular phone;
    a memory associated with the external device and accessible by the cellular phone, said memory storing data;
    a data output unit that outputs the data stored in the memory;
    a detector that detects an identification number of the cellular phone when the cellular phone communicates with the communicator; and
    an access controller that allows or prevents access to the data stored in the memory depending on whether the cellular phone is pre-registered to access the data,
    wherein the access controller prevents the access to the data stored in the memory when the identification number is not pre-registered or the identification number is not detected.

2. An information terminal device according to claim 1, further comprising means for storing a plurality of identification numbers of cellular phones to be registered, and wherein the access controller controls the access to data stored in the memory separately for each identification number.

3. An information terminal device according to claim 1, wherein data to be controlled by the access controller is received via a cellular phone connected to the connector.

4. An information terminal device according to claim 3, wherein data to be controlled by the access controller includes at least one of a received E-mail list, on-line-obtained information obtained from an external device, and a phone number list.

5. An information terminal device according to claim 1 further comprising a navigation device, wherein data to be controlled by the access controller is settable by a user in the navigation device.

6. An information terminal device according to claim 5, wherein data to be controlled by the access controller is received via a cellular phone connected to the connector.

7. An information terminal device according to claim 6, wherein data to be controlled by the access controller includes at least one of a received E-mail list, on-line-obtained information obtained from an external device, and a phone number list.

8. An information terminal device according to claim 5, wherein data to be controlled by the access controller includes at least one of a registered location point list, route data, and locus data.

9. An information terminal device according to claim 1, further comprising a position detector that detects a present position of a mobile body,
    wherein the access controller controls the access to data stored in the memory, in accordance with the position detected by the position detector.

10. An information terminal device according to claim 1, further comprising a time detector that detects a present time,
    wherein the access controller controls the access to data stored in the memory, in accordance with the time detected by the time detector.

11. An information terminal device according to claim 1, wherein the access to the data is varied and controlled in correspondence to the identification number that is detected.

12. An information terminal device according to claim 1, wherein the external device is installed in a vehicle.

13. An information terminal device comprising:
    a communication device that communicates with an external device;
    a connector that connects to the communication device, the connector communication with the external device;
    a memory associated with the external device and accessible by communication device, said memory storing data;
    a data output unit that outputs the data from the memory;
    a detector that detects identification data of the communication device when the communication device communicates with the external device; and
    an access controller that restricts access to the data stored in the memory depending on whether the communication device is pre-registered to access the data,
    wherein the access controller prevents access to the data stored in the memory when the identification data detected by the detector is not pre-registered or the identification data is not detected.

14. An information terminal device according to claim 13, wherein the communication device is a cellular phone, and the identification data is a phone number of the cellular phone.

15. An information terminal device according to claim 13, wherein the information terminal device allows a plurality of pieces of identification data of cellular phones to be registered, and the access to data stored in the memory is controlled separately for each piece of the identification data.

16. An information terminal device according to claim 13, wherein data to be controlled by the access controller is received via the communication device.

17. An information terminal device according to claim 16, wherein data to be controlled by the access controller includes at least one of a received E-mail list, on-line-obtained information obtained from an external device, and a phone number list.

18. An information terminal device according to claim 13, wherein the access to the data is varied and controlled in correspondence to the identification data that is detected.

19. An information terminal device according to claim 13, wherein the external device is installed in a vehicle.

20. A control method for an information terminal device comprising:
    providing a cellular phone that communicates with an external device;
    providing a connector between the cellular phone and the external device;
    controlling data communication with the cellular phone;
    storing data in a memory associated with the external device and accessible by the cellular phone;
    outputting data stored in the memory;
    detecting an identification number of the cellular phone when the cellular phone communicates with the external device; and preventing an access to data stored in the memory when the identification number is not pre-registered or the identification number is not detected.

21. A control method for an information terminal device according to claim 20 further comprising:
storing a plurality of identification numbers of cellular phones to be registered; and
controlling the access to data stored in the memory separately for each identification number.

22. A control method for an information terminal device according to claim 20 further comprising:
determining whether data stored in the memory is received via the cellular phone; and
preventing the access to the data received via the cellular phone.

23. A control method for an information terminal device according to claim 22, wherein data to be prevented the access includes at least one of a received E-mail list, on-line-obtained information obtained from an external device, and a phone number list.

24. A control method for an information terminal device according to claim 20, wherein data to be prevented the access is set by user in a navigation system.

25. A control method for an information terminal device according to claim 20, further comprising providing the external device in a vehicle.

26. A control method for an information terminal device according to claim 20, further comprising varying and controlling the access to the data in correspondence to the identification number that is detected.

27. A vehicle comprising:
a body defining an interior space; and
an information terminal device installed within the interior space, the information terminal device comprising:
an external device installed in the vehicle and cooperable with a cellular phone;
a connector that connects to the cellular phone, the connector communicating with the external device;
a communicator that controls data communication with the cellular phone;
a memory associated with the external device and accessible by the cellular phone, said memory storing data;
a data output unit that outputs the data stored in the memory;
a detector that detects an identification number of the cellular phone when the cellular phone communicates with the communicator; and
an access controller that allows or prevents access to the data stored in the memory depending on whether the cellular phone is pre-registered to access the data,
wherein the access controller prevents the access to the data stored in the memory when the identification number is not pre-registered or the identification number is not detected.

28. A vehicle according to claim 27, wherein access to the data is varied and controlled in correspondence to the identification number that is detected.

29. A vehicle comprising:
a body defining an interior space; and
an information terminal device installed within the interior space, the information terminal device comprising:
an external device that communicates with a communication device;
a connector that connects to the communication device, the connector communicating with the external device;
a memory associated with the external device and accessible by the communication device, said memory storing data;
a data output unit that outputs the data from the memory;
a detector that detects identification data of the communication device when the communication device communicates with the external device; and
an access controller that restricts access to the data stored in the memory depending on whether the communication device is pre-registered to access the data,
wherein the access controller prevents access to the data stored in the memory when the identification data detected by the detector is not pre-registered or the identification data is not detected.

30. A vehicle according to claim 29, wherein the access to the data is varied and controlled in correspondence to the identification number that is detected.

31. An information terminal device that is accessible by a plurality of individuals, each of said individuals having a cellular telephone, the device comprising:
an external device;
a connector that connects to the cellular phone, the connector communicating with the external device;
a memory, associated with the external device and accessible by the cellular phone, that stores data;
a data output unit that outputs the data stored in the memory;
a detector that detects an identification number of each said cellular phone when each said cellular phone attempts to access the memory; and
an access controller that 1) prevents access to the data stored in the memory when, for each said cellular phone, the identification number is not pre-registered or detected and 2) allows access to the data stored in the memory for each said cellular phone for which the identification number thereof is detected and pre-registered to access the data.

32. An information terminal device according to claim 31, wherein the external device is installed in a vehicle.

33. An information terminal device according to claim 31 wherein the access to the data is varied and controlled in correspondence to the identification number that is detected.

34. An information terminal device comprising:
an external device that communicates with a cellular phone;
a connector that connects to the cellular phone, the connector communicating with the external device;
a communicator that controls data communication with the cellular phone;
a memory associated with the external device and accessible by the cellular phone, said memory storing data;
a data output unit that outputs the data stored in the memory;
a detector that detects an identification number of the cellular phone when the cellular phone communicates with the communicator; and
an access controller that allows or prevents access to the data stored in the memory depending on whether the cellular phone is pre-registered to access the data,
wherein the access controller prevents the access to the data stored in the memory when the identification number is not pre-registered or the identification number is not detected.

35. An information terminal device according to claim 34, wherein the data to be controlled by the access controller is received via a cellular phone connected to the connector.

36. An information terminal device according to claim 35, wherein the data to be controlled by the access controller includes at least one of a received E-mail list, on-line-obtained information obtained from an external device, and a phone number list.

37. An information terminal device according to claim 34, further comprising a navigation device, wherein data to be controlled by the access controller is settable by a user in the navigation device.

38. An information terminal device according to claim 37, wherein the data to be controlled by the access controller is received via a cellular phone connected to the connector.

39. An information terminal device according to claim 38 wherein the data to be controlled by the access controller includes at least one of a received E-mail list, on-line-obtained information obtained from an external device, and a phone number list.

40. An information terminal device according to claim 37, wherein the data to be controlled by the access controller includes at least one of a registered location point list, route data, and locus data.

41. An information terminal device according to claim 34, wherein the access to the data is varied and controlled in correspondence to the identification number that is detected.

42. An information terminal device according to claim 34, wherein the external device is installed in a vehicle.

43. An information terminal device according to claim 34, further comprising means for storing a plurality of indentification number of cellular phones to be registered, and wherein the access controller controls the access to the data stored in the memory separately for each identification number.

44. An information terminal device according to claim 34, further comprising a position detector that detects a present position of a mobile body,
  wherein the access controller controls the access to the data stored in the memory, in accordance with the position detected by the position detector.

45. An information terminal device according to claim 34, further comprising a time detector that detects a present time, wherein the access controller controls the access to the data stored in the memory, in accordance with the time detected by the time detector.

* * * * *